United States Patent [19]

Jaconetty et al.

[11] 4,017,695

[45] Apr. 12, 1977

[54] CUSTOMER OPERATED GAIN CONTROL CIRCUIT

[75] Inventors: George Richard Jaconetty; Steven Robert Palmquist, both of Boulder, Colo.

[73] Assignee: Bell Telephone Laboratories, Incorporated, Murray Hill, N.J.

[22] Filed: Sept. 30, 1974

[21] Appl. No.: 510,430

[52] U.S. Cl. .......................................... 179/170 R
[51] Int. Cl.² .......................................... H04B 3/36
[58] Field of Search ............ 179/16 A, 16 F, 170.4, 179/6, 1 VL, 1 SW, 84 VF, 84 SS, 143, 6 E, 170 R

[56] References Cited

UNITED STATES PATENTS

| | | | |
|---|---|---|---|
| 1,586,308 | 5/1926 | Homrighous | 179/16 F |
| 2,141,476 | 12/1938 | Lomax | 179/16 F |
| 2,406,053 | 8/1946 | Wright | 179/16 F |
| 2,580,709 | 1/1952 | Wicks | 179/16 F |
| 2,653,999 | 9/1953 | Wright | 179/16 F |
| 3,141,931 | 7/1964 | Zarouni | 179/6 |
| 3,280,261 | 10/1966 | Korn | 179/170.4 |
| 3,428,756 | 2/1969 | Epstein | 179/16 A |
| 3,496,309 | 2/1970 | Kalb | 179/170.4 |
| 3,573,443 | 4/1971 | Fein | 235/150.53 |
| 3,806,658 | 4/1974 | Anderson et al. | 179/16 F |
| 3,821,494 | 6/1974 | Besseyre | 179/170.6 |

*Primary Examiner*—Kathleen H. Claffy
*Assistant Examiner*—E. S. Kemeny
*Attorney, Agent, or Firm*—Howard R. Popper

[57] ABSTRACT

A customer controlled gain circuit allows a customer to control the transmission amplifier gain in a trunk circuit by means of multifrequency signals. The trunk circuit contains a multifrequency receiver which receives and decodes gain control commands. The commands are applied to a bidirectional shift register containing a single circulating bit. One gain command causes the bit to shift in one direction while another gain command causes the bit to shift in the other direction. The bit appearing at the outputs of the shift register drives a plurality of FET gate circuits which switch various feedback paths in the trunk transmission amplifier.

13 Claims, 2 Drawing Figures

CUSTOMER OPERATED GAIN CONTROL CIRCUIT

BACKGROUND OF THE INVENTION

This invention relates to telecommunications switching systems and in particular to transmission gain control circuits in telephone switching systems.

Transmission gain control in telephone switching systems is usually performed in the trunk circuit under control of the marker. The system marker is provided information relating to the calling and called lines or trunks and inserts a predetermined pad into the transmission circuit to achieve gain equalization based on premeasured characteristics. However, in some telephone circuits, the predetermined value approach cannot be used since the transmission characteristics of the telephone circuit cannot be determined in advance. For example, remote access circuits have been developed which allow an ordinary subscriber to dial up a PBX from a remote central office. A special access trunk located at the PBX answers the call and sends a service request to the PBX as if the trunk appeared as a station at the PBX. The trunk subsequently cuts the central office line through to the PBX and the remote customer is then allowed to use PBX services such as tie lines and foreign exchange lines. If such a customer attempts to use a foreign exchange line, the resulting transmission quality may be so poor as to be unacceptable. Since the length of the foreign exchange line and its transmission qualities cannot be determined by the customer's serving central office, the predetermined pad equalization circuits in the central office trunk circuit cannot be used to compensate for the transmission loss caused by the foreign exchange line.

Various arrangements have been developed in the prior art which allow a customer to vary tranmission gain by means of amplifiers located at the station set. These arrangements, however, tend to be costly because an amplifier and associated controls must be provided at each station set.

Therefore, there appears to be a need for a customer controlled gain circuit which would allow the customer to adjust the transmission gain at the trunk circuit according to his present needs.

Accordingly, it is an object of the present invention to simplify customer controlled transmission gain circuits.

It is a further object of the present invention to eliminate station set amplifiers from customer controlled gain circuits.

SUMMARY OF THE INVENTION

The foregoing and other objects are achieved in accordance with the principles of the present invention in one illustrative embodiment thereof wherein a customer operated gain control circuit is provided in a trunk circuit to control the transmission gain of amplifiers located therein. The circuit comprises a multifrequency receiver which receives multifrequency commands generated at the subscriber's pushbutton station set. The commands are decoded and applied to a control circuit which removes or inserts elements into the feedback paths of the trunk transmission amplifiers.

In particular, the decoded commands provided by the multifrequency receiver are applied to a bidirectional shift register which contains a circulating "one" bit. The gain commands cause the shift register to shift the "one" bit in one direction or the other, depending on whether the customer wishes the gain to increase or decrease. The "one" bit appearing at a shift register output is applied through level shifting circuitry to an FET gate. The FET gate in turn switches a feedback path in the transmission amplifier. As the "one" bit shifts from output to output at the shift register in response to different customer commands, different FET gates complete different feedback paths at the amplifier to vary its gain.

DETAILED DESCRIPTION

Figure 1:
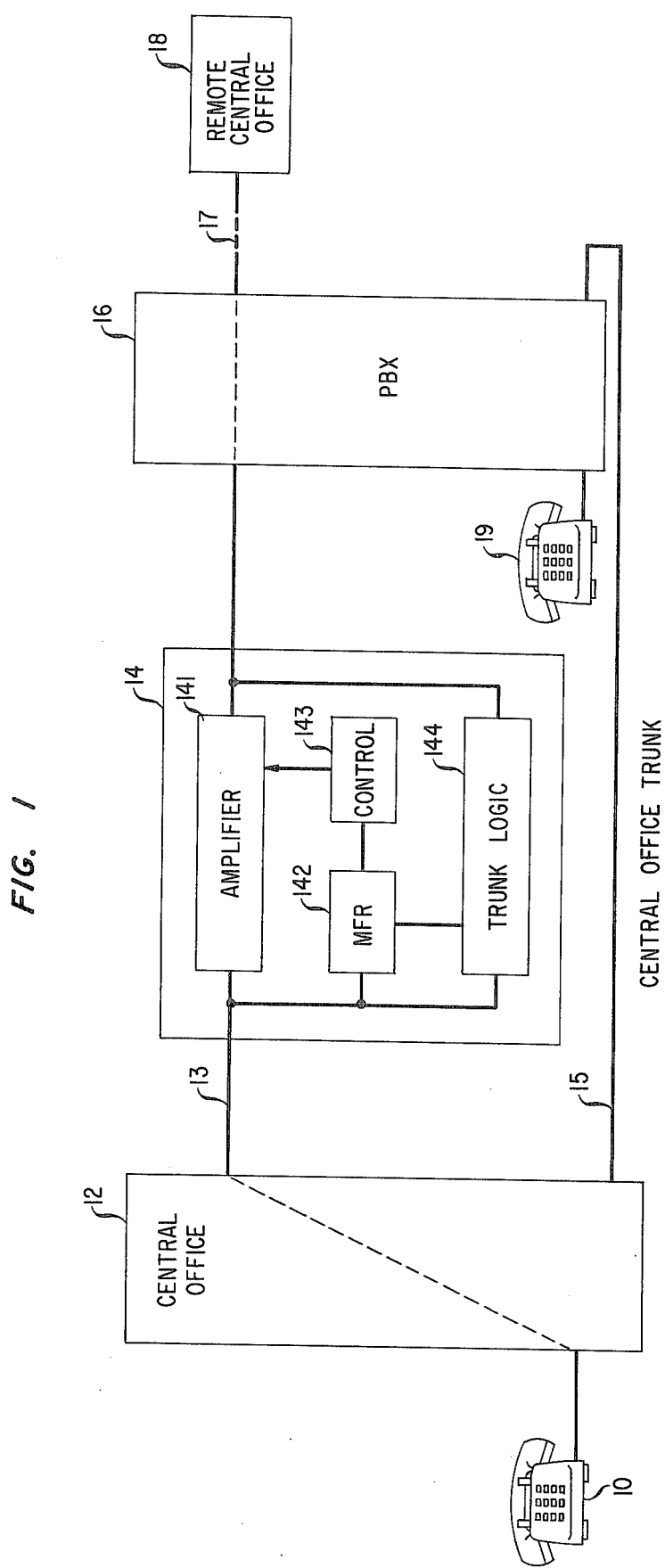
FIG. 1 is a block diagram of a specific embodiment of the invention as incorporated into a remote access trunk.

FIG. 1 of the drawing shows a remote access trunk 13 which allows a customer located at station set 10 to connect to PBX 16 and use all the associated services. When using remote access trunk 13, station set 10 need not have any special arrangements in order for it to connect to PBX 16. In particular, in order to access PBX 16, the customer at station set 10 connects to trunk 13 through central office 12 by dialing a special number. PBX 16 is also connected to central office 12 by means of regular central office trunks 15. However, in order to use the services provided by PBX 16, station set 10 must reach remote access trunk circuit 13. Station set 10 can access and use services provided by PBX 16 because trunk circuit 13 does not appear on PBX 16 as a regular trunk circuit but rather appears as an internal station set (such as station 19).

When station set 10 is connected to trunk 13 by central office 12, trunk logic 144 in trunk terminal equipment 14 trips the incoming ringing and applies answer supervision. Trunk logic 144 then places a service request to PBX 16. After PBX 16 has detected the service request, trunk circuit 13 may be connected through PBX 16 to any station such as station 19 or to any available special service such as foreign exchange line 17. Thus, trunk circuit 13 allows station set 10 to reach remote central offices, such as central office 18, by means of the foreign exchange trunk terminated on PBX 16 without having a special arrangement such as an off-premise station on PBX 16. If station set 10 accesses remote centeral office 18 by means of trunk terminal equipment 13, the normal transmission gain in the circuit may be insufficient to allow satisfactory conversation. Unsatisfactory gain may occur even if the transmission circuits at central office 12 are provided with automatic gain compensation because although station set 10 appears effectively as an off-premise station of PBX 16, the marker at central office 12 is not provided with this information.

In order to allow station set 10 to directly control the gain of transmission amplifier 141 in trunk circuit 14, trunk circuit 14 has been modified in accordance with the principles of the present invention to include a remote control gain circuit consisting of multifrequency receiver 142 and amplifier control 143.

Figure 2:
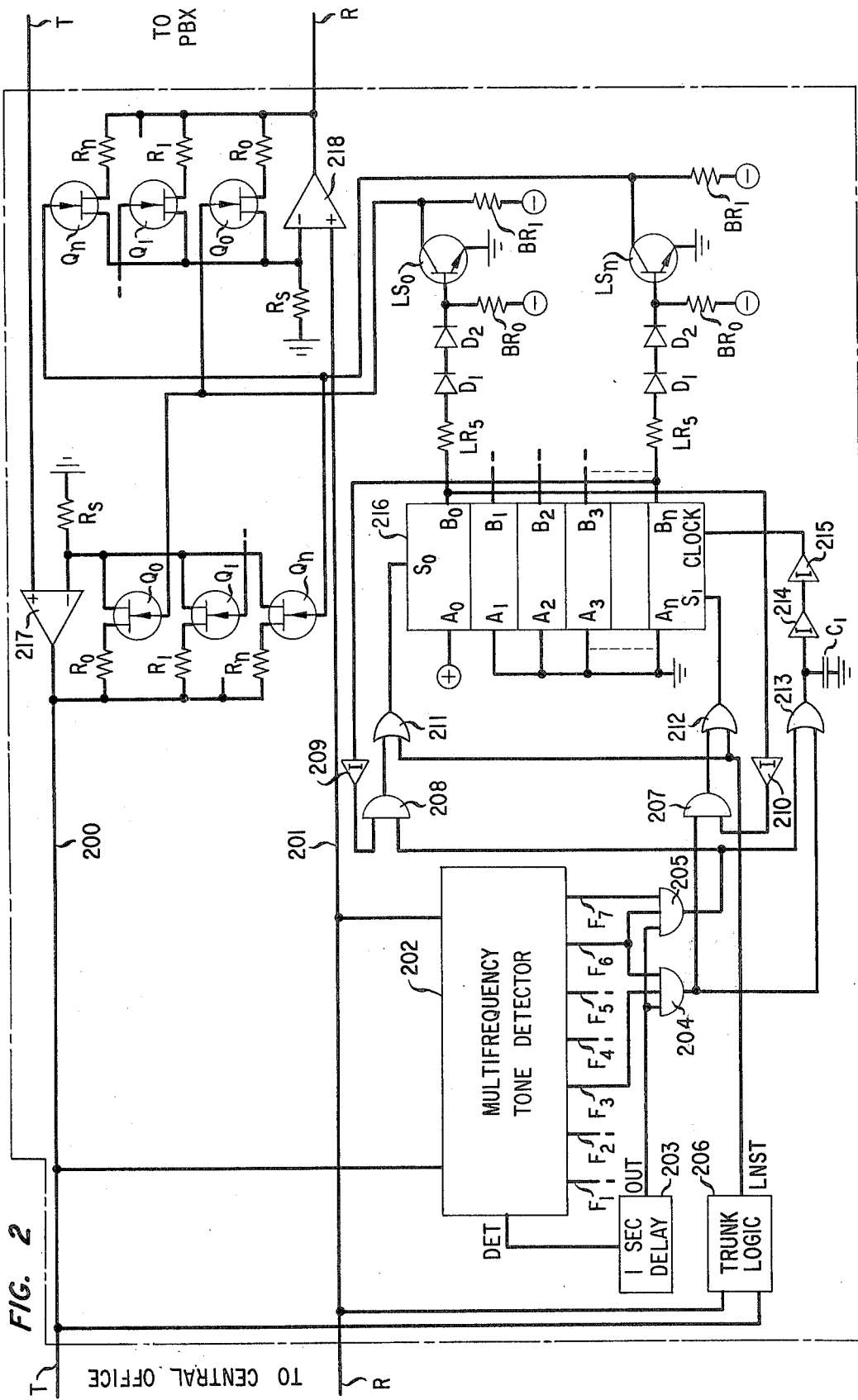
FIG. 2 is a schematic circuit diagram of the gain control circuitry shown in block form in FIG. 1.

Referring to FIG. 2, a schematic diagram of amplifier 141 and control circuit 143 is shown. Tip lead 200 and ring lead 201, which are connected to the central office, are also bridged to trunk logic circuit 206. Trunk logic 206 contains various supervision circuits which are not important to the understanding of the present invention, for example, ringing detector circuits and answer supervision circuits which allow the trunk circuit to receive an incoming call and to forward the call towards the PBX. These circuits are of a wellknown design and details are omitted in order to simplify the disclosure of the invention. During the procedure of receiving an incoming call, trunk logic 206 momentarily places a high signal on lead LNST to initialize the gain control circuitry of the present invention. In particular, the high signal on lead LNST is applied through OR gates 211 and 212 to mode control terminals $S_0$ and $S_1$ of bidirectional shift register 216. Shift register 216 is of a well-known design and consists of a number of stages, each of which has an input A- and an output B-. The register shifts its contents either up or down on the rising edge of a clock signal applied to the clock input. In addition, shift register 216 may be loaded in parallel from inputs $A_0$ to $A_n$ depending on the signals applied to mode control terminals $S_0$ and $S_1$. Specifically, a high signal applied to both mode control terminals $S_0$ and $S_1$ causes signals appearing at inputs $A_0$ through $A_n$ to be loaded in parallel into the corresponding stages of shift register 216. A high signal at terminal $S_0$ and a low signal at terminal $S_1$ cause the contents of the shift register to be shifted down one position at each rising edge of the clock pulses applied to the clock lead. Similarly, a high signal applied at terminal $S_1$ and a low signal applied at terminal $S_0$ cause the contents of shift register 216 to be shifted up under control of the clock pulses. If a low signal is provided to both terminals $S_0$ and $S_1$, the contents of shift register 216 remain the same rgardless of clock pulses applied to the clock input. A register such as shift register 216 is described in detail in *Texas Instruments Integrated Circuits Catalogue for Design Engineers*, 1st Ed., pp. 9–014 (circuits SN54194, SN74194).

The high signal which is momentarily applied to terminals $S_0$ and $S_1$ of shift register 216 by OR gates 211 and 212 and lead LNST therefore causes shift register 216 to load signals appearing at inputs $A_0$ through $A_n$ into its various stages. As shown, lead $A_0$ is connected to a positive potential while leads $A_1$ through $A_n$ are grounded. Thus, a digital "one" is loaded into the uppermost stage of shift register 216 while the other stages are loaded with zeros. The "one" bit in the first stage of shift register 216 appears at output $B_0$ and turns on transistor $LS_0$ (which is normally biased off by register $BR_0$) by means of resistor $LR_5$ and diodes $D_1$ and $D_2$. Turned on transistor $LS_0$ applies a ground potential to the gate electrode of FET switches $Q_0$. A ground signal at the gate of FETs $Q_0$ causes them to enter a low resistive state, effectively connecting resistors $R_0$ into the feedback loops of amplifiers 217 and 218. Transmission amplifiers 217 and 218 are set up in a well-known negative feedback configuration. In this configuration, the gain of each amplifier closely approximates the ratio of the feedback resistor $R_0$ to resistor $R_s$. Thus initially the amplifier gain is $R_0/R_s$; this gain is the minimum gain provided by the control circuitry.

In addition, the high signal at output $B_0$ of shift register 216 caused by the "one" bit in the first stage is applied as a low signal by inverter 210 to AND gate 207, disabling it. Disabled AND gate 207 applies a low signal to terminal $S_1$ of shift register 216 via OR gate 212 and prevents a received gain control signal from shifting shift register 216 up to reduce the gain of the circuit below minimum gain, as will hereinafter be described.

Tip lead 200 and ring lead 201 are also bridged to multifrequency detector 202. Multifrequency detector 202 is a well-known device which detects multifrequency tone signals generated by a pushbutton telephone set and converts the signal into a two out of seven code. Multifrequency detector 202 is provided with seven outputs $F_1$ through $F_7$ on which the code corresponding to the detected digit appears. When the customer keys a digit, for example, the number "5", the digit is received over the leads 200 and 201 by multifrequency detector 202, which thereupon places high signals on two of leads $F_1$ through $F_7$ to indicate that a particular digit has been received. Assume that when the digit 5 is received multifrequency detector 202 places a high signal on leads $F_6$ and $F_7$. The high signals on leads $F_6$ and $F_7$ enable AND gate 205. In addition, multifrequency detector 202 provides a high signal on lead DET when multifrequency signals corresponding to any valid digit are received. The high signal on lead DET is applied to the delay multivibrator 203 which provides a high signal at its output after a one second time delay. This high signal operates enabled gate 205 to produce a high signal at its output. The one second delay provided by delay circuit 203 is necessary to distinguish gain control digits from digits which are received in the course of normal dialing procedures. Only those digits which persist for longer than one second will be interpreted by the circuit as a gain control command.

Similarly, if a different gain control command, for example, the digit 8, is received by multifrequency detector 202 a high signal is placed on two other leads, for example, leads $F_3$ and $F_6$. A high signal on leads $F_3$ and $F_6$ is applied to enable AND gate 204, which gate is operated after one second by the high output of delay circuit 203. Thus the digit 5 received by multifrequency detector 202 for more than one second will be interpreted as a gain control command to operate gate 205. Similarly, the digit 8 will be received to operate AND gate 204.

Assume, for example, that the customer wishes to increase the gain in his telephone circuit; in order to do so he keys the digit 5 at his station set. This digit is received by multifrequency detector 202 and operates gate 205 as previously described. The high signal appearing at the output of gate 205 is applied to terminal $S_0$ of shift register 216 through AND gate 208 and OR gate 211. AND gate 204 is disabled and applies a low signal via AND gate 207 and OR gate 212 to terminal $S_1$ of shift register 216. As previously described, a high signal at terminal $S_0$ and low signal at terminal $S_1$ causes shift register 216 to shift its contents down under control of pulses appearing at the clock input. Clock pulses are provided by OR gate 213 operating in conjunction with capacitor $C_1$ and inverters 214 and 215. The high signal generated at the output of gate 205 by a received multifrequency digit is applied to the upper input of OR gate 213. When a high signal is applied to one of its inputs, OR gate 213 begins to apply a high signal at its output. However, the output of OR gate 213 cannot become high until capacitor $C_1$ has charged. After the charging delay provided by capacitor $C_1$, the high signal produced by OR gate 213 is forwarded by inverters 214 and 215 (which are used for buffering) to the clock input of shift register 216. The delay caused by capacitor $C_1$ is necessary to allow control signals at terminals $S_0$ and $S_1$ of shift register 216 to settle down before clock pulses are applied.

When the clock pulses are applied to shift register 216, its contents shift down by one stage. As previously described, shift register 216 was initialized during call setup procedure with a "one" in the first stage and "zero" in subsequent stages. When the contents of shift register 216 shift down, the "one" moves from the first stage to the second stage and is replaced by a 0. Shift register 216 thus acts as a binary up/down counter which counts in powers of two (that is, as the "one" bit is successively shifted the binary output of shift register 216 will correspond to the numbers 2, 4, 8, 16, etc.) Thus, the signal at output $B_0$ changes from a high to a low signal while a high signal appears at output $B_1$ in response to a clock pulse appearing at the clock. A low signal at output $B_0$ turns off level shift transistor $LS_0$ and FET gates $Q_0$. Feedback elements $R_0$ are therefore removed from the feedback paths of transmission amplifiers 217 and 218. The high output at output $B_1$ of shift register 216 turns on FET gates $Q_1$ by means of a level shift transistor (not shown) equivalent to level shift transistor $LS_0$. Turned on FET gates $Q_1$ causes resistor $R_1$ to be inserted into the feedback loops of amplifiers 217 and 218. Therefore, after the digit 5 has been keyed into the circuitry by the customer, the amplifier gain of amplifiers 217 and 218 has been changed from $R_0/R_s$ to $R_1/R_s$. Resistor values $R_1$ are chosen to be larger than resistor values $R_0$, so that the amplifier gains will be increased.

Similarly, a customer may further increase the gain by keying additional digits 5 into the system. Each time multifrequency detector 202 detects the digit 5, shift register 216 is shifted down one position in the manner just described. The shift results in a new set of transistor FET gates being turned on to increase the amplifier gains of amplifiers 217 and 218. This operation may continue until the "one" bit in shift register 216 reaches stage $n$ at which point the "one" signal appears at output $B_n$. A high signal at output $B_n$ turns on level shift transistor $LS_n$ via resistor $LR_5$ and diodes $D_1$ and $D_2$. Turned on transistor $LS_n$ in turn operates FET gates $Q_n$ inserting resistors $R_n$ into the feedback loop of amplifiers 217 and 218. Thus, the effective gain of amplifiers 217 and 218 is $R_n/R_s$. This is the maximum gain provided by the system. To prevent the customer from attempting to increase the gain beyond the maximum provided, the high signal appearing at output $B_n$ at shift register 216 is applied to inverter 209 which in turn supplies a low signal to the upper input of AND gate 208. The low signal disables AND gate 208 and causes it to apply a low signal to OR gate 211 which in turn applies a low signal to terminal $S_0$ of shift register 216. A low signal is applied to terminal $S_1$ of shift register 216 by AND gates 204 and 207 and OR gate 212. Shift register 216 therefore does not shift its contents in response to clock pulses and the customer is prevented from further shifting the gain of the circuit.

If the customer desires to decrease the gain in the circuit, he keys the digit 8 which is received by multifrequency detector 202, which in turn operates AND gate 204 as previously described. The high signal appearing at the output of operated AND gate 204 is applied via AND gate 207 and OR gate 212 to the $S_1$ terminal of shift register 216. The high signal at AND gate 204 is also applied to OR gate 213, which together with capacitor $C_1$ and inverters 214 and 215 supplies clock signals for shift register 216. A low signal is applied to terminal $S_0$ of shift register 216 by AND gate 205 via AND gates 208 and OR gate 211. As previously described when shift register 216 receives a high signal at its $S_1$ terminal and a low signal at its $S_0$ terminal, it shifts its contents up one stage in response to clock pulses applied to the clock input. Each time the digit 8 is keyed by the customer, shift register 216 shifts its contents up one position. Thus, the one bit which is contained in shift register 216 is shifted upward successively turning on level shift transistors and associated FET gates, thereby inserting lower value resistors sequentially into the feedback loops of amplifiers 217 and 218 to decrease the gain. The customer may decrease the gain until the one bit appears at output $B_0$ of shift register 216. In this position, level shift transistor $LS_0$ is turned on and resistors $R_0$ are inserted into the feedback loops of amplifiers 217 and 218 by FET gates $Q_0$. The effective gain of amplifiers 217 and 218 is therefore $R_0$ divided by $R_s$. This is the minimum gain provided by the system. To prevent the customer from reducing the gain below the minimum, the high signal appearing at output $B_0$ of shift register 216 is applied as a low signal to AND gate 207 by inverter 210. AND gate 207 is thereby disabled and applies a low signal to terminal $S_1$ of shift register 216 and prevents shift register 216 from shifting in response to clock pulses.

What is claimed is:

1. Apparatus for controlling the gain in a switching path between any pair of a plurality of subscriber station sets each of said sets having call signaling means, said apparatus comprising, in combination, an amplifier connected in said path, means for detecting signals from said call signaling means subsequent to the establishment of said path, means including an up/down counter responsive to said detecting means for generating control signals, and means responsive to the generation of said control signals for adjusting the gain of said amplifier.

2. Gain control apparatus according to claim 1 wherein said amplifier is a feedback amplifier and said adjusting means further comprises a plurality of feedback elements selectively insertable into the feedback path of said amplifier, and logic means responsive to said control signals for inserting and removing said plurality of feedback elements.

3. A customer operated gain control circuit for a telephone switching system having a transmission path feedback amplifier, said circuit comprising, an up/down counter for generating count signals, control means responsive to gain control commands generated by a customer for controlling said counter to count up and down, a plurality of feedback elements selectively insertable into the feedback path of said feedback amplifier to change the gain thereof, and logic means responsive to said count signals for inserting and removing said feedback elements.

4. A gain control circuit in accordance with claim 3 wherein said control means further comprises a receiver for receiving and detecting said gain control commands, and mode control means responsive to one detected gain control command for controlling said up/down counter to count up and responsive to another detected gain control command for controlling said up/down counter to count down.

5. A gain control circuit according to claim 3 wherein said feedback elements are arranged in parallel in said feedback path and said feedback elements are resistive devices.

6. A gain control circuit according to claim 5 wherein said logic means further comprises switches connected in series with said resistive feedback devices, said switches being responsive to said count signals so that only one of said plurality of feedback elements is connected into said feedback path at a time.

7. A customer operated gain control circuit for a telephone switching system having a transmission path feedback amplifier, said circuit comprising a receiver for detecting gain control command signals generated by a customer,
a shift register, having a plurality of outputs, operable to produce a control signal on one of said plurality of outputs,
a trigger circuit for controlling said shift register to shift said control signal among said outputs responsive to a detected gain control command, a plurality of feedback elements selectively insertable into the feedback path of said amplifier to change the gain thereof and
logic means for controlling the insertion and removal of said feedback elements responsive to said control signal appearing on one of said outputs.

8. A gain control circuit according to claim 7 wherein said trigger circuit is responsive to one gain control command for controlling said shift register to shift in one direction and responsive to another gain control command for controlling said shift register to shift in the other direction.

9. A customer operated gain control circuit for a telephone switching system having a transmission path feedback amplifier, said circuit comprising a receiver for detecting gain control command signals generated by a customer,
a shift register, having a plurality of outputs operable to produce a control signal on one of said plurality of outputs,
a trigger circuit for controlling said shift register to said control signal among said outputs responsive to a detected gain control command,
a plurality of feedback elements selectively insertable into the feedback path of said amplifier to change the gain thereof, each one of said plurality of feedback elements corresponding to one of said shift register outputs, and
logic means for controlling the insertion and removal of said feedback elements responsive to said control signal appearing on one of said outputs.

10. A gain control circuit according to claim 9 wherein said logic means further comprises field-effect transistor devices connected in series with said feedback elements, said field-effect transistor devices being responsive to said control signal appearing on one of said shift register outputs for connecting said feedback elements into said feedback path.

11. A customer operated gain control circuit for a telephone switching system having a transmission path feedback amplifier and a plurality of multifrequency pushbutton sets, said circuit comprising
a multifrequency receiver for detecting a first and a second gain control signal generated by one of said station sets,
a bidirectional shift register having a plurality of stages, each of said stages having an output representative of the contents thereof,
initializing means for inserting a one bit into one of said plurality of shift register stages and zero bits into the others of said plurality of stages,
first mode means for causing said shift register to shift said one bit one stage in one direction each time said receiver detects said first gain control signal,
second mode means for causing said shift register to shift said one bit one stage in the other direction each time said receiver detects said second gain control signal,
a plurality of resistive feedback elements connectable in parallel in the feedback path of said transmission amplifier.
a plurality of switches, each of said switches being connected in series with one of said resistive feedback elements, each of said switches also being connected to one of said shift register outputs, responsive to said one bit appearing at said one of said shift register outputs for connecting said one of said feedback elements into the feedback path of said amplifier.

12. A customer operated gain control circuit for a telephone switching system having a transmission path feedback amplifier and a plurality of multifrequency pushbutton sets, said circuit comprising
a multifrequency receiver for detecting a first and a second gain control signal generated by one of said station sets,
a bidirectional shift register having a plurality of stages, each of said stages having an output representative of the contents thereof,
initializing means for inserting a one bit into one of said plurality of shift register stages and zero bits into the others of said plurality of stages,
first mode means for causing said shift register to shift said one bit one stage in one direction each time said receiver detects said first gain control signal,
second mode means for causing said shift register to shift said one bit one stage in the other direction each time said receiver detects said second gain control signal,
a plurality of resistive feedback elements connectable in parallel in the feedback path of said transmission amplifier,
a plurality of switches, each of said switches being connected in series with one of said resistive feedback elements, each of said switches also being connected to one of said shift register outputs responsive to said one bit appearing at said one of said shift register outputs for connecting said one of said feedback elements into the feedback path of said amplifier, and
means for controlling said first and said second mode means to prevent said one bit from being shifted out of said shift register.

13. A gain control circuit in accordance with claim 12 further comprising means associated with said multifrequency receiver for distinguishing between said gain control signals and ordinary digits dialed by said station sets in the course of a call and means associated with said first and said second mode means for generating clock pulses responsive to the detection of said first and said second gain control commands.

* * * * *